United States Patent [19]

Itabashi et al.

[11] Patent Number: 5,457,079
[45] Date of Patent: Oct. 10, 1995

[54] COPPER-BASED OXIDATION CATALYST AND ITS APPLICATIONS

[75] Inventors: Takeyuki Itabashi; Fujiko Kinosaki, both of Hitachi; Akio Takahashi, Hitachiota; Haruo Akahoshi, Hitachi, all of Japan

[73] Assignee: Hitachi, Ltd., Tokyo, Japan

[21] Appl. No.: 124,076

[22] Filed: Sep. 21, 1993

[30] Foreign Application Priority Data

Sep. 21, 1992 [JP] Japan ................................ 4-251199

[51] Int. Cl.⁶ .................................................. B01J 23/72
[52] U.S. Cl. ......................... 502/331; 502/101; 502/337; 502/338; 502/345
[58] Field of Search ........................ 502/330, 331, 502/337, 338, 101, 345

[56] References Cited

U.S. PATENT DOCUMENTS

| | | | |
|---|---|---|---|
| 3,978,005 | 8/1976 | Kawagoshi et al. | 502/331 |
| 4,430,188 | 2/1984 | Cohn | 502/101 |
| 4,515,673 | 5/1985 | Hayfield | 502/101 |

*Primary Examiner*—Anthony McFarlane
*Attorney, Agent, or Firm*—Antonelli, Terry, Stout & Kraus

[57] ABSTRACT

A copper-based oxidation catalyst comprising a substrate of copper or copper alloy and regions of a metal composed mainly of a group VIII element in close contact with the substrate, the surface of the substrate being partly exposed to the outside, has a high catalytic activity on the carbonyl oxidation reaction and is effective as a catalyst for electroless plating, a fuel cell electrode material, a catalyst for treating waste water or waste liquor or an oxidation reaction catalyst.

15 Claims, 4 Drawing Sheets

COPPER-BASED OXIDATION CATALYST AND ITS APPLICATIONS

BACKGROUND OF THE INVENTION

1) Field of the Invention

The present invention relates to a copper-based oxidation catalyst having a stable and catalytically highly active surface.

2) Related Art

It has been well known that the copper surface is active on oxidation reaction of formaldehyde, etc. and the copper surface has been applied also in catalysts for electroless copper plating, etc.

When electroless plating is applied to a non-conductive (dielectric) substrate, it is necessary to deposit a plating catalyst on the non-conductive substrate in advance. Palladium is known as such a catalyst and is practically widely used. According to one procedure, palladium can be deposited on a non-conductive substrate by dipping a non-conductive substrate into an aqueous stannous chloride solution acidified with hydrochloric acid, and then dipping the substrate into an aqueous palladium chloride solution acidified with hydrochloric acid, thereby carrying out a redox reaction on the surface of the substrate according to the following process:

$$Pd^{++} + Sn^{++} \rightarrow Pd + Sn^{++++}$$

According to another procedure, a palladium colloid coated with stannous ions is used as a plating catalyst.

In the foregoing procedures using a palladium catalyst, palladium metal insoluble in an electroless plating solution may be released from the catalyst-deposited substrate and entered into an electroless plating solution, thereby giving rise to autolysis of the electroless plating solution itself. Furthermore, particularly the procedure using both of the aqueous stannous chloride solution acidified with hydrochloric acid and the aqueous palladium chloride solution acidified with hydrochloric acid has a risk of attacking the substrate, because the solutions are highly acidic. Still furthermore, the palladium catalyst belongs to a noble catalyst species, which makes the catalyst cost higher.

A copper colloid is known as another electroless plating catalyst besides the palladium. In the production of a printed circuit board using a copper colloid, for example, circuit formation on a non-conductive substrate by electroless plating, a plating resist is formed on non-circuit-destined parts, a copper colloid is deposited on circuit-destined parts and also on the plating resist, and then the copper colloid catalyst on the plating resist is removed by mechanical polishing (JP-A-62-271491). In that case, the copper colloid catalyst-deposited non-conductive substrate is dried by heating at 100°–160° C. to enhance the adhesion between the surface of the non-conductive substrate and the copper colloid catalyst. The dried copper catalyst is in an oxidized state and has no catalytic activity, and thus is subjected to a reduction treatment by a reducing agent. In the electroless plating using such a copper colloid catalyst, it takes much time in starting of electroless plating reaction. Alternatively, an active electroless plating solution, that is, an unstable electroless plating solution, must be used, as disclosed in JP-A 62-297472, page 6, line 19-page 7, line 2.

An aqueous solution of copper colloid catalyst can be prepared by adding dimethylamineborane to an aqueous solution containing copper ions, gelatin and polyethylene glycol at a pH of 1 to 2, thereby reducing the copper ions to metallic copper, and then adjusting the aqueous solution to a pH of 2 to 4, as disclosed, for example, in JP-A 61-23762.

Furthermore, a combination of copper and nickel is disclosed in JP-A 2-207844 as a catalyst for electrolytic reduction of carbon dioxide, etc. The catalyst is a reduction catalyst for electrolytically reducing a reducible compound such as carbon dioxide or carbon monoxide under a reduction potential substantially equal to the theoretical potential, thereby forming useful compounds such as methane, ethylene, etc.

Copper surface is very susceptible to oxidation, and, once oxidized, has no catalytic activity. Even if reduced, the resulting copper surface has a considerably poor activity, as compared with noble metal catalysts such as platinum, palladium, etc.

Nickel, on the other hand, has a high corrosion resistance and no activity on the oxidation reaction of formaldehyde, etc.

In the above-mentioned prior art procedure using a copper colloid catalyst, the copper colloid deposited on a non-conductive substrate is readily oxidized by exposure to the atmospheric air and deactivated. Deactivation of the copper colloid catalyst is considerable particularly when heated to 100° to 160° C., and complete reactivation is hard to obtain even by using a reducing agent. Metallic copper itself has a poor catalytic activity, and, when used as a plating catalyst, parts where no plating reaction takes place, that is, the so called plating non-deposited parts are highly liable to appear. Thus, the copper colloid catalyst has not been so far widely utilized.

It is also known that the metallic copper has an activity on the oxidation reaction of lower alcohols as a fuel for a fuel cell, such as methanol, etc. However, its activity is considerably lower than that of noble metals such as platinum, palladium, etc., and thus the metallic copper has not been so far utilized as an electrode material for a fuel cell.

SUMMARY OF THE INVENTION

An object of the present invention is to provide a copper-based oxidation catalyst having a high corrosion resistance and a high activity.

Another object of the present invention is to provide a copper-based catalyst for electroless plating having a distinguished catalytic activity without autolysis of an electroless plating solution.

Other object of the present invention is to provide an electrode material for a fuel cell.

Further object of the present invention is to provide a copper-based oxidation catalyst capable of converting the global environment-polluting substances or harmful substances such as aldehydes, etc. to other harmless substances by oxidation.

According to the present invention, these objects can be attained by:

(1) A copper-based oxidation catalyst, which comprises a substrate of copper or copper alloy and regions comprising a metal composed mainly of a group VIII element or its oxide in close contact with the substrate, the surface of the substrate being partly exposed to the outside;

(2) A copper-based oxidation catalyst, which comprises a substrate, which surface is made of copper or copper alloy, and regions of a metal composed mainly of a group VIII element or its oxide in contact with the surface of the substrate, the surface of the substrate being partly exposed to the outside.

(3) The above-mentioned copper-based oxidation catalysts wherein a covering ratio of coverage area of the metal composed mainly of the group VIII element or its oxide to the effective surface area of the substrate is 0.01 to less than 1.

(4) The above-mentioned copper-based oxidation catalysts wherein the metal composed mainly of the group VIII element or its oxide are in the form of a film having a thickness of 1 to 5 nm;

(5) The above-mentioned copper-based oxidation catalysts wherein the metal composed mainly of the group VIII element or its oxide is nickel, cobalt or iron or its oxide; and (6) The above-mentioned copper-based oxidation catalysts wherein the substrate is in the form of fine particles, foamed mass, thin film plate or honeycomb structure.

DETAILED DESCRIPTION OF THE INVENTION

A covering ratio of less than 1 defined in the foregoing item (3) designates such a state that a substrate of metallic copper coated with a coating metal selected from the group VIII metal elements still has chemical properties same as those of copper and not identical with those of the coating metal. That is, a coating metal film may be in the form of a porous thin film or the coating metal is in an island form shown in FIG. 1, where nickel islands 1 are discretely distributed on the surface of a copper substrate 2, while exposing the surface of the substrate to the outside through between the nickel islands. Complete coating or coverage of the copper metal substrate surface with the coating metal cannot attain the above-mentioned objects of the present invention. In other words, it is important that copper or copper alloy as a substrate is partly exposed to the outside. That is, even if the entire surface of the substrate of metallic copper seems to have been coated with the coating metal from the viewpoint of the amount of electric current required for the electroplating process, vapor deposition time required for the vapor deposition process, etc., the substrate of metallic copper coated with the film of the coating metal can be used so far as it can still shows the same properties as those of substrate copper. A covering ratio of less than 0.01 is not preferable, because no catalytic activity as an oxidation catalyst is fully obtained.

As a coating metal, the group VIII metal elements can be used. Nickel, cobalt and iron are preferable from the viewpoint of their cost, and they can be used in the oxide form.

The metallic copper substrate can be coated with nickel, cobalt or iron by electroplating, electroless plating, vapor deposition, sputtering, etc. Particularly, electroplating is preferable, because the covering ratio can be controlled by adjusting an amount of electric current required for the electroplating. Colloid particles of metallic copper can be readily coated with nickel, cobalt or iron by adding a reducing agent such as dimethylamineborane, etc. to a copper colloid solution, and adding an aqueous solution containing ions of nickel, cobalt or iron thereto.

Figure 1:
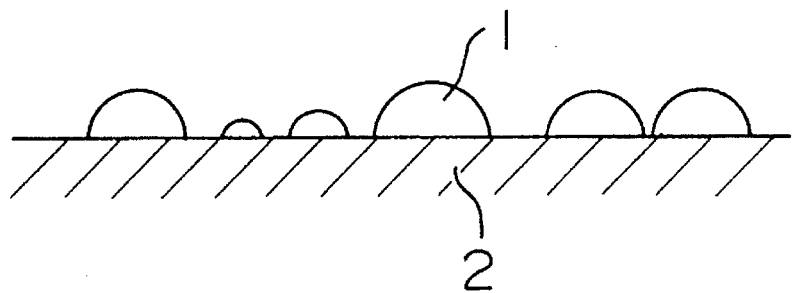
FIG. 1 is a schematic cross-sectional view showing one example of a nickel deposition state on the surface of the present copper-based oxidation catalyst.

Catalyst particles coated with nickel, cobalt or iron in the island forms on the surfaces of colloid particles, as shown in FIG. 1, can be obtained, for example, by controlling the amount of metallic ions of nickel, cobalt or iron to be added to less than the amount of copper in the copper colloid solution. Furthermore, the covering ratio of nickel, cobalt or iron on copper colloid particle can be estimated from the entire surface of copper colloid obtained from particle sizes and concentration of copper colloid particles and moles of ions of nickel, cobalt or iron to be added, and thus the covering ratio can be controlled. For example, a copper colloid catalyst coated with nickel in a covering ratio of 0.5 can be obtained by adding about 0.01 mole of nickel ions to a copper colloid solution containing copper particles, 0.1 μm in radius, prepared from one mole of copper.

In case of electroless copper plating, a copper-plated substrate with a good plating adhesion can be obtained by depositing the catalyst onto a nonconductive substrate according to the ordinary procedure.

In case of converting global environment-polluting substances such as aldehydes or harmful substances to other harmless substances, the conversion can be carried out in an electrolytic cell using an electrode of copper substrate in the plate form or the honeycomb form, coated with a coating material such as nickel or the like in a covering ratio of less than 1 by electroplating, electroless plating, vapor deposition, sputtering, etc.

Figure 6:
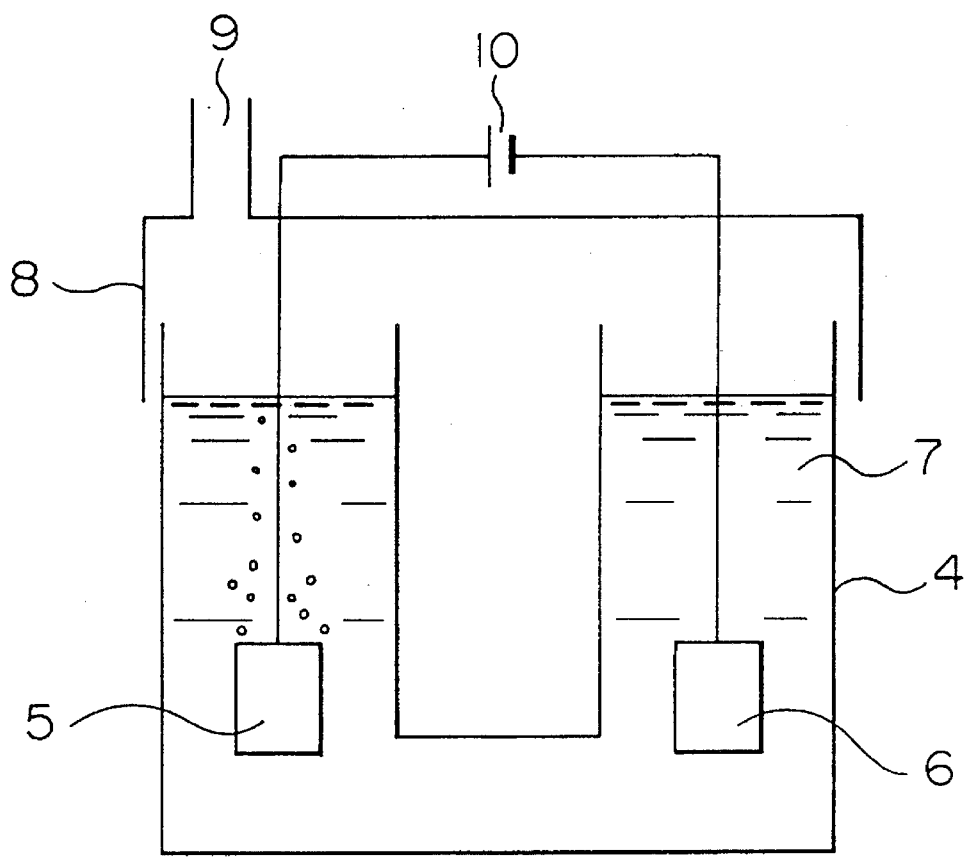
FIG. 6 is a schematic cross-sectional view showing the structure of an electrolytic cell for waste water treatment.

FIG. 6 is a schematic view of the structure of an electrolytic cell 4 for oxidizing a waste water. When waste water 7 containing formaldehyde as a harmful substance is electrolytically oxidized to formic acid, a hydrogen gas is generated at a catalyst-modified electrode 5 (anode), which is modified with the catalyst, on the basis of oxidation reaction of formaldehyde, and a hydrogen gas is generated at a counter electrode 6 (cathode) on the basis of water. These hydrogen gases, when collected through a generated gas collector duct 9 open to a hood 8 for the electrolytic cell 4, can be reutilized as clean hydrogen energy without generating $CO_2$. As the necessary electric energy for the electrolysis, natural energy from a solar cell 10, or the like can be utilized, whereby an effective system for treating waste water can be completed. The catalyst-modified electrode, when used as a fuel electrode for a fuel cell, is in a structure comprising a copper substrate in the plate or honeycomb form, coated with nickel or the like in a covering ratio of less than 1, as in that for the above-mentioned electrlytic cell.

Figure 7:
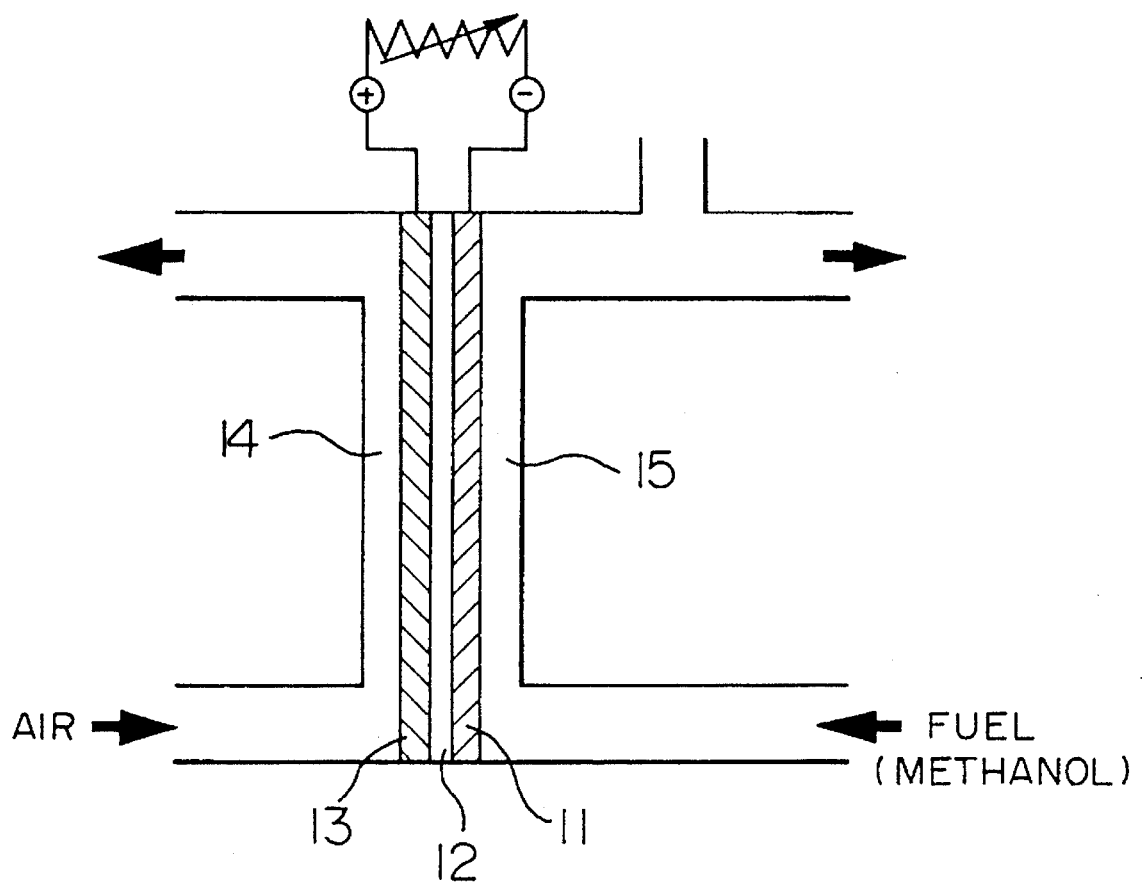
FIG. 7 is a schematic view showing the key structure of a methanol fuel cell.

FIG. 7 illustrates essential structural members of an efficient, low cost methanol-type fuel cell, which comprises a catalyst-modified fuel electrode 11 as an electrode for oxidizing methanol and an air electrode 13 as an oxidizing electrode, provided in a fuel chamber 15 and an electrolytic chamber 14, respectively, through an electrolyte layer 12.

In the electroless copper plating, carbonyls such as formaldehyde and glyoxylic acid are often used as a reducing agent for reducing copper ions in the electroless plating solution. Electroless plating proceeds according to a redox reaction between the reducing agent and metal ions in the electroless plating solution. The reaction proceeds only on the catalyst on the surface of a material to be plated. That is, no electroless plating reaction proceeds unless the surface of a material to be plated has a catalytic oxidation activity on carbonyls.

Generally, the electroless plating solution is a highly alkaline solution having a pH of about 12, and palladium, platinum, gold, silver, copper, etc. are known as metals having a catalytic activity on the oxidation reaction of carbonyls in the solution. In the electroless copper plating, a copper catalyst is distinguished particularly because it will not contaminate the electroless copper solution, though its catalytic activity is very low.

On the other hand, the group VIII metals of the periodic table, such as nickel, cobalt and iron, have a surface of hydroxide or oxide under a carbonyl oxidation-occasioning potential in an alkaline solution having a pH of about 12, and thus are quite inert to the carbonyl oxidation.

According to the present invention the catalytic activity on the oxidation reaction can be considerably increased, as compared with that of copper, by coating copper, which has a low catalytic activity on the electrolytic carbonyl oxidation reaction, with nickel, cobalt, iron or the like, which is inert to the reaction, in a covering ratio of less then 1. Reasons why the catalytic activity on the oxidation reaction can be considerably increased by coating copper with quite an inert metal such as nickel or like in a covering ratio of less than 1 can be explained as follows:

That is, it seems that the carbonyl electrolytic oxidation reaction proceeds according to the following reaction mechanism:

$$HCHO+H_2O \rightarrow CH_2(OH)_2 \quad (1)$$

$$CH_2(OH)_2+OH \rightarrow CH_2OHO+H_2O \quad (2)$$

$$CH_2OHO \rightarrow CHOHO+H \quad (3)$$

$$CHOHO+OH \rightarrow HCOO+H_2O+e \quad (4)$$

$$H+OH \rightarrow H_2O+e \quad (5)$$

$$H+H \rightarrow H_2 \quad (6)$$

Alcoholate ions ($CH_2OHO^-$) formed by the disproportionation reaction are adsorbed onto the catalyst surface and also hydrogen atoms are adsorbed onto the catalyst surface at the same time. Then, the alcoholate ions adsorbed on the catalyst surface turn to carboxylate ions ($HCOO^-$) through electron migration.

On the other hand, the adsorbed hydrogen atoms turn to water or a hydrogen gas according to the above-mentioned equation (5) or (6). The reaction route of adsorbed hydrogen atoms via the above-mentioned equation (5) is accompanied with electron migration, and thus the carbonyl oxidation reaction belongs to a dielectronic reaction, as shown by the following equation (7), whereas the reaction route of adsorbed hydrogen via the above-mentioned equation (6) belongs to a moncelectronic reaction, as shown by the following equation (8):

$$HCHO+3OH \rightarrow HCOO+2H_2O2e \quad (7)$$

$$HCHO+2CH \rightarrow HCOO+H_2O+1/2H_2\uparrow+e \quad (8)$$

Generally, palladium and platinum perform the dielectronic reaction, whereas gold, silver and copper perform the monoelectronic reaction. The present copper-based oxidation catalyst can be presumed to perform the monoelectronic reaction, because generation of a hydrogen gas is observable on the catalysts surface during the reaction. That is, it can be presumed that the reaction proceeds through the same reaction mechanism as that on the copper surface, but with a higher catalytic activity for the following reasons. It seems that the reaction to form a hydrogen gas through recombination of hydrogen atoms, as shown by the above-mentioned equation (6), proceeds slowly on the copper surface, but faster on the surface of such a metal as nickel. The reaction proceeds like the so called Tafel reaction, one of basic reactions in the hydrogen electrode reactions in the electrochemical field. It is said that the Tafel reaction proceed slowly on a copper surface, but faster on a nickel surface. That is, the reaction shown by the above-mentioned equation (6) proceeds smoothly on the present copper-based oxidation catalyst comprising a copper substrate coated with nickel in a covering ratio of less than 1, and thus it seems that the catalytic activity is increased in the present invention.

The present copper-based oxidation catalyst can be used in a broad field including an electroless plating catalyst, a fuel cell electrode, a catalyst for treating waste water or liquor, etc.

PREFERRED EMBODIMENTS OF THE INVENTION

The present invention will be described in detail below, referring to Examples.

EXAMPLE 1

A copper electrode having an area of 1 cm² was subjected to soft etching in an etching solution containing 200 g/l of ammonium peroxodisulfate and 20 g/l of sulfuric acid at 35° C. for 2 hours, thereby cleaning the surface of copper electrode. Then, the copper electrode was dipped in a nickel plating solution containing 220 g/l of nickel (II) sulfate hexahydrate, 15 g/l of boric acid and 15 g/l of sodium chloride, adjusted to a pH of 5.2 to 5.8 with sodium hydroxide and subjected to nickel electrolytic plating at a current density of 0.05 mA/cm², while controlling a covering ratio of nickel on the copper electrode surface by adjusting the plating time.

Electrolytic oxidation reaction of formaldehyde in an aqueous 1N sodium hydroxide solution containing 0.2 mol/l of formaldehyde with the thus obtained nickel-coated copper electrode was investigated according to a potential sweep method by applying an electrode potential of −1.1 V to −0.45 V to the electrode at a sweep rate of 50 mV/sec and measuring the resulting oxidation current of formaldehyde. The results are shown in FIG. 2.

Figure 2:
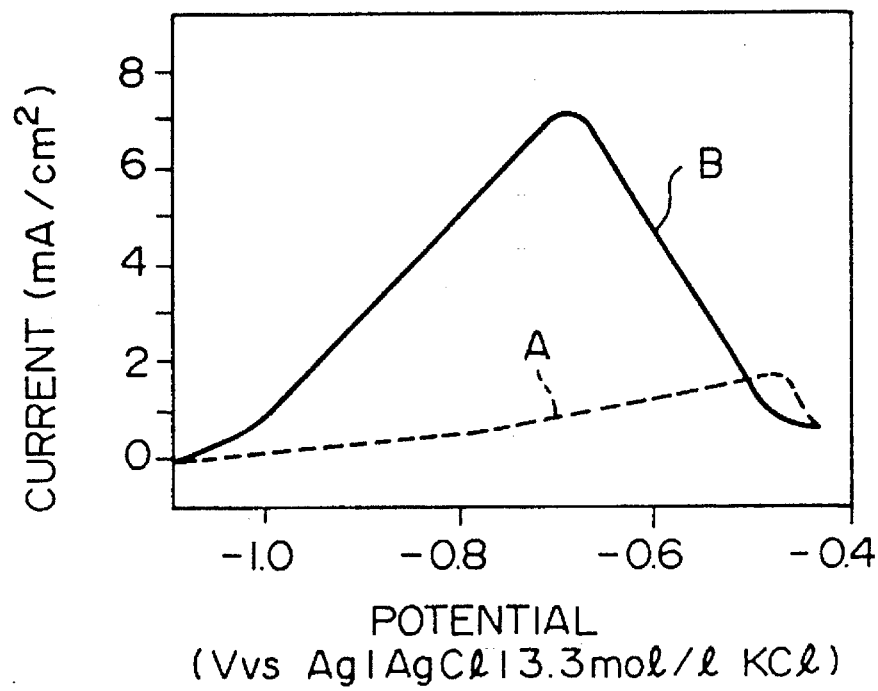
FIG. 2 is a current-potential curve diagram of formaldehyde oxidation reaction at a copper electrode and a nickel-coated copper electrode according to Example 1.

FIG. 2 shows changes in the electrolytic oxidation current of formaldehyde, where curve A shows the case of naked copper electrode and curve B the case of nickel-coated copper electrode. Nickel plating time for obtaining the nickel-coated copper electrode was 5 seconds, and the covering ratio of nickel was estimated to be about 0.68 from the amount of electric current required for the plating. It was also confirmed that formaldehyde was oxidized to formic acid.

It is apparent from FIG. 2 that the peak of formaldehyde oxidation current on the nickel-coated copper electrode is about 7 mA/cm$^2$, which is about 3 times as large as that on the naked copper electrode. The electrode potential under which the oxidation current starts to flow is shifted by about 0.3 V towards the cathode, and an overvoltage due to the formaldehyde oxidation is reduced.

As shown above, it was observed that the catalytic activity was remarkably increased by coating the copper electrode with nickel (covering ratio=0.68).

Figure 3:
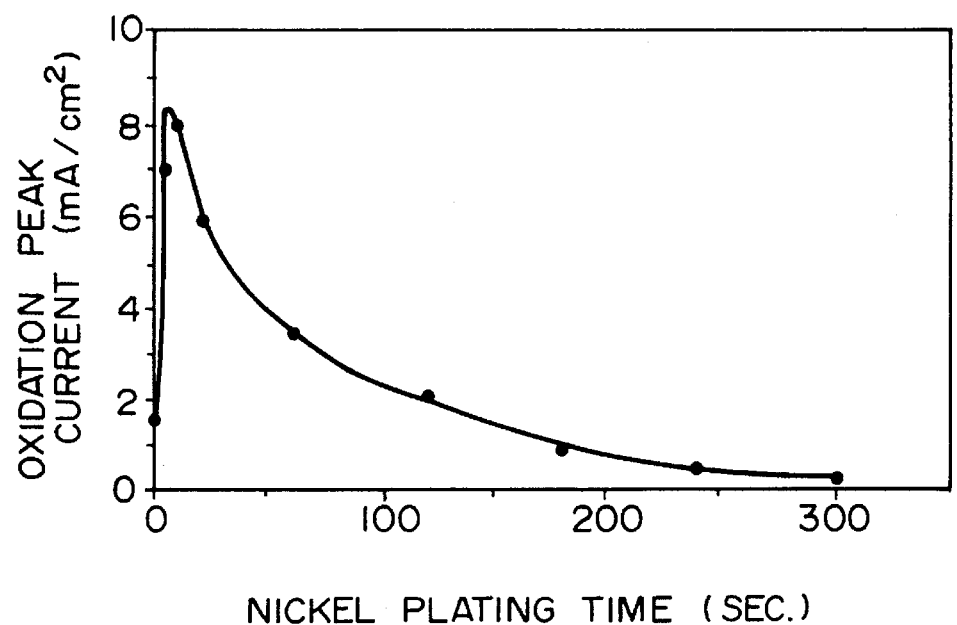
FIG. 3 is a diagram showing relations between nickel electrolytic plating time and formaldehyde oxidation peak current at a nickel-coated copper electrode according to Example 1.

Formaldehyde oxidation current was investigated with nickel-coated coper electrodes prepared in the same manner as above, except that the nickel plating time was changed in a range of 0 to 5 minutes. The results are shown in FIG. 3.

Catalytic formaldehyde oxidation activity of the nickel-coated copper electrode with a nickel plating time of about 120 seconds was substantially equal to that of naked copper electrode, and the catalytic oxidation activity with nickel-coated copper electrode with a plating tine of more than 120 seconds was less than that of the naked copper electrode, because it seems that the copper electrode surface was fully coated with nickel inert to the oxidation reaction, whereby the catalyst surface fully turned to the nickel metal surface.

With a plating time of less than 120 seconds, the catalytic oxidation activity was observable. Nickel plating at a current density of 0.05 mA/cm$^2$ would be able to fully coat the entire copper electrode surface with nickel with a plating time of about 10 seconds. However, actual observation of higher catalytic activity of nickel-coated copper electrode than that of naked copper electrode seems to be due to nickel coating in the island form being on the copper electrode substrate, as shown in FIG. 1.

It is apparent from this Example that the nickel-coated copper electrode in a covering ratio of nickel of less than 1 has a higher catalytic activity on the electrolytic formaldehyde oxidation reaction.

COMPARATIVE EXAMPLE 1

A copper electrode having a area of 1 cm$^2$ was subjected to soft etching in an etching solution containing 200 g/l of ammonium peroxodisulfate and 20 g/l of sulfuric acid at 35° C. for 2 minutes in the same manner as in Example 1, thereby cleaning the surface of copper electrode.

Electrolytic oxidation reaction of formaldehyde in an aqueous 1N sodium hydroxide solution containing 0.2 mol/l of formaldehyde with the thus prepared copper electrode was investigated according to a potential sweep method. It was found that the peak of oxidation current based on the formaldehyde oxidation reaction on the naked copper electrode was 1.8 mA/cm$^2$, which was about ¼ times as small as that of the nickel-coated copper electrode (covering ratio of nickel:0.68) of Example 1.

COMPARATIVE EXAMPLE 2

A nickel electrode having an area of 1 cm$^2$ was subjected to soft etching in an aqueous 4N nitric acid solution at 30° C. for one minutes, thereby cleaning the surface of nickel electrode.

Electrolytic oxidation reaction of formaldehyde in an aqueous 1N sodium hydroxide solution containing 0.2 mol/l of formaldehyde with the thus prepared nickel electrode was investigated according to a potential sweep method. It was found that no oxidation current based on the formaldehyde oxidation reaction was observed at all, and thus no formaldehyde oxidation reaction took place at all on the nickel electrode.

EXAMPLE 2

0.15 moles of nickel (II) sulfate was added to 1 l of an aqueous copper colloid solution containing 1 mol/l of metallic copper and 10 g/l of dimethylamine-borone as a reducing agent, thereby preparing a nickel-coated copper colloid catalyst.

Then, a fiber glass-reinforced epoxy resin substrate having throughholes, 0.5 mm in diameter, was dipped in the nickel-coated copper colloid solution, and then the throughhole walls of the epoxy resin plate were subjected to electroless copper plating in an electroless copper plating solution having the following composition at a solution temperature of 72° C. It was found that the throughhole walls were completely coated with a copper plating film:

CuSO$_4$5H$_2$O 10 g/l

Disodium ethylene diaminetetraacetate 30 g/l

Aqueous 37% HCHO Solution (formalin) 3 ml/l

NaOH 12 g/l 2,2'-dipyridyl 30 mg/l

Polyethylene glycol (average molecular weight: 600) 10 g/l

COMPARATIVE EXAMPLE 3

Throughhole walls of glass fiber-reinforced epoxy resin substrate were subjected to electroless copper plating in the same manner as in Example 2 except that a copper colloid catalyst without nickel coating was used in place of the nickel-coated copper colloid catalyst. Relations between the preservation time in air right after the catalyst deposition by dipping in the copper colloid catalyst solution to the start of electroless plating and the state of electroless plating were investigated for the nickel-coated copper colloid catalyst and the nickel-noncoated copper colloid catalyst and the results are given in the following Table.

| Nickel plating on copper | Preservation time (days) | | | | | |
|---|---|---|---|---|---|---|
| colloid catalyst | 0.5 | 1 | 2 | 3 | 5 | 7 |
| Done (Ni covering ratio: 0.68) | o | o | o | o | o | o |
| None | Δ | x | x | x | x | x | o: Uniform plating
Δ: Partially uneven plating
x: uneven plating

It was found neither non-deposition of plating nor uneven plating was observed at all in case of the nickel-coated copper colloid catalyst even when the substrate was preserved in air for one week after the catalyst deposition, and good plating films could be obtained with a good oxidation resistance in air.

EXAMPLE 3

Copper electrodes whose surfaces were cleaned in the same manner as in Example 1 were dipped in an aqueous iron plating solution containing 30 g/l of ferric chloride and subjected to electrolytic iron plating at a current density of 0.05 mA/cm$^2$, while controlling the iron covering ratio by adjusting the plating time in the same manner as that for the nickel plating.

Figure 4:
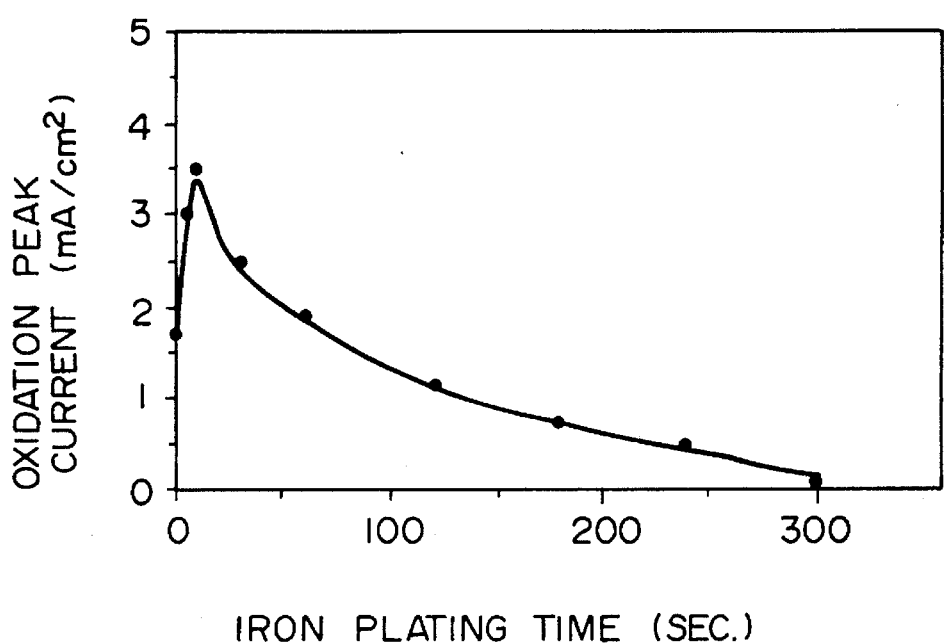
FIG. 4 is a diagram showing relations between iron electrolytic plating time and formaldehyde oxidation peak current at an iron-coated copper electrode according to Example 3.

Electrolytic oxidation reaction of formaldehyde in an aqueous 1N sodium hydroxide solution containing 0.2 mol/l of formaldehyde with the thus iron-coated copper electrodes was investigated according to a potential sweep method. Relations between the iron electrolytic plating time and the peak current of electrolytic oxidation reaction are shown in FIG. 4. When the electrolytic iron plating time is less than 100 seconds, an oxidation current peak was observed in the same manner as in the case of the nickel-coated copper electrode.

EXAMPLE 4

Copper electrodes whose surfaces were cleaned in the same manner as in Example 1 were dipped in an aqueous cobalt solution containing 15 g/l of cobalt sulfate and subjected to electrolytic cobalt plating at a current density of 0.05 mA/cm$^2$, while controlling the cobalt covering ratio by adjusting the plating time in the same manner as that for the nickel plating.

Figure 5:
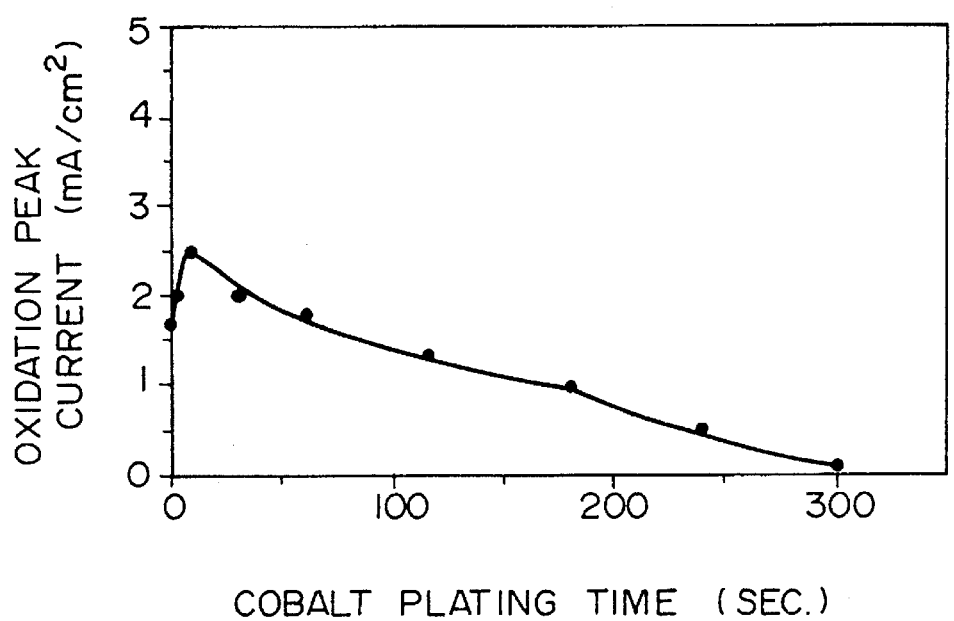
FIG. 5 is a diagram showing relations between cobalt electrolytic plating time and formaldehyde oxidation peak current at a cobalt-coated copper electrode according to Example 4.

Catalytic activity of the thus obtained cobalt-coated copper electrodes on the electrolytic oxidation reaction of formaldehyde was investigated in the same manner as in Example 1. Relations between the electrolytic cobalt plating time and the peak current of electrolytic oxidation reaction are shown in FIG. 5. When the electrolytic plating time is less than 100 seconds, an oxidation current peak was observed in the same manner as in the case of the nickel-coated copper electrode.

EXAMPLE 5

Catalytic activity of nickel-coated copper electrodes prepared in the same manner as in Example 1 on methanol electrolytic oxidation reaction was evaluated. Good results were obtained.

The present copper-based oxidation catalyst comprising a copper-based metal substrate coated with a group VIII transition metal in a covering ratio of less than 1 has a high catalytic activity on carbonyl oxidation reaction and is effective as a catalyst for electroless plating, a fuel cell electrode material or a catalyst for treating waste water or waste liquor. Particularly, nickel, cobalt and iron are available at a low cost and thus preferable among the group VIII transition metals.

What is claimed is:

1. A copper-based oxidation catalyst, which comprises a substrate of copper or a copper alloy having a surface, portions of said surface being in contact with regions consisting of a metal of a Group VIII element or its oxide, other portions of the surface of the substrate being exposed and not in contact with said regions; said surface providing total surface area of the substrate.

2. A copper-based oxidation catalyst, which comprises a substrate having a surface which is made of copper or a copper alloy, a part of the surface being in contact with regions of a metal consisting of a Group VIII element or its oxide, other parts of the surface of the substrate being exposed and not in contact with said regions; said surface providing total surface area of the substrate.

3. A copper-based oxidation catalyst which comprises a substrate of copper or copper alloy and a film of metal consisting of a Group VIII element or its oxide coated on the substrate, the film being porous to expose portions of the substrate not covered by the film.

4. A copper-based oxidation catalyst according to any one of claims 1, 2 and 3, wherein a covering ratio of the coverage area of the metal consisting of the Group VIII element or its oxide to an effective surface area of the substrate is 0.01 to less than 1.

5. A copper-based oxidation catalyst according to claims 1 or 2, wherein the metal consisting of the Group VIII element or its oxide is in the form of a film coated on said substrate, said film having a thickness of 1 to 5 nm.

6. A copper-based oxidation catalyst according to claim 4, wherein the metal consisting of the Group VIII element or its oxide is in the form of a film coated on said substrate, said film having a thickness of 1 to 5 nm.

7. A copper-based oxidation catalyst according to any one of claims 1 to 3, wherein the metal consisting mainly of the Group VIII element or its oxide is nickel, cobalt or iron or its oxide.

8. A copper-based oxidation catalyst according to claim 4, wherein the metal composed of the Group VIII element or its oxide is nickel, cobalt or iron or its oxide.

9. A copper-based oxidation catalyst according to any one of claims 1 to 3, wherein the substrate is in the form of fine particles, foamed mass, thin film plate or honeycomb structure.

10. A copper-based oxidation catalyst according to claim 4, wherein the substrate is in the form of fine particles, foamed mass, thin film plate or honeycomb structure.

11. An activator for electroless copper plating, which comprises fine particles of copper or copper alloy, each particle having surface covered with a film of a metal consisting of a Group VIII element or its oxide, portions of the surface of the particles being exposed and not covered by the film.

12. An activator according to claim 11, wherein the film comprises a porous film forming a coating over each particle and the metal composed mainly of the group VIII element or its oxide is nickel, cobalt or iron or its oxide.

13. An activator according to claim 11, wherein the film is in the form of a plurality of discreet islands coated on each particle, said metal composed mainly of the group VIII element or its oxide is nickel, cobalt or iron or its oxide.

14. A cooper-based oxidation catalyst according to claim 5, wherein the film comprises a porous film so that the substrate is partly exposed.

15. A copper-based oxidation catalyst which comprises a substrate of copper or copper alloy having surface, portions of the surface being coated with a metal consisting of Group VIII element or its oxide, a covering ratio of an area of the substrate covered by being coated with the metal to the surface area of the substrate before being coated being 0.01 to less than 1.

* * * * *